W. G. BIXBY.
VARIABLE SPEED MECHANISM.
APPLICATION FILED SEPT. 24, 1904.
1,063,410.
Patented June 3, 1913.
3 SHEETS—SHEET 1.
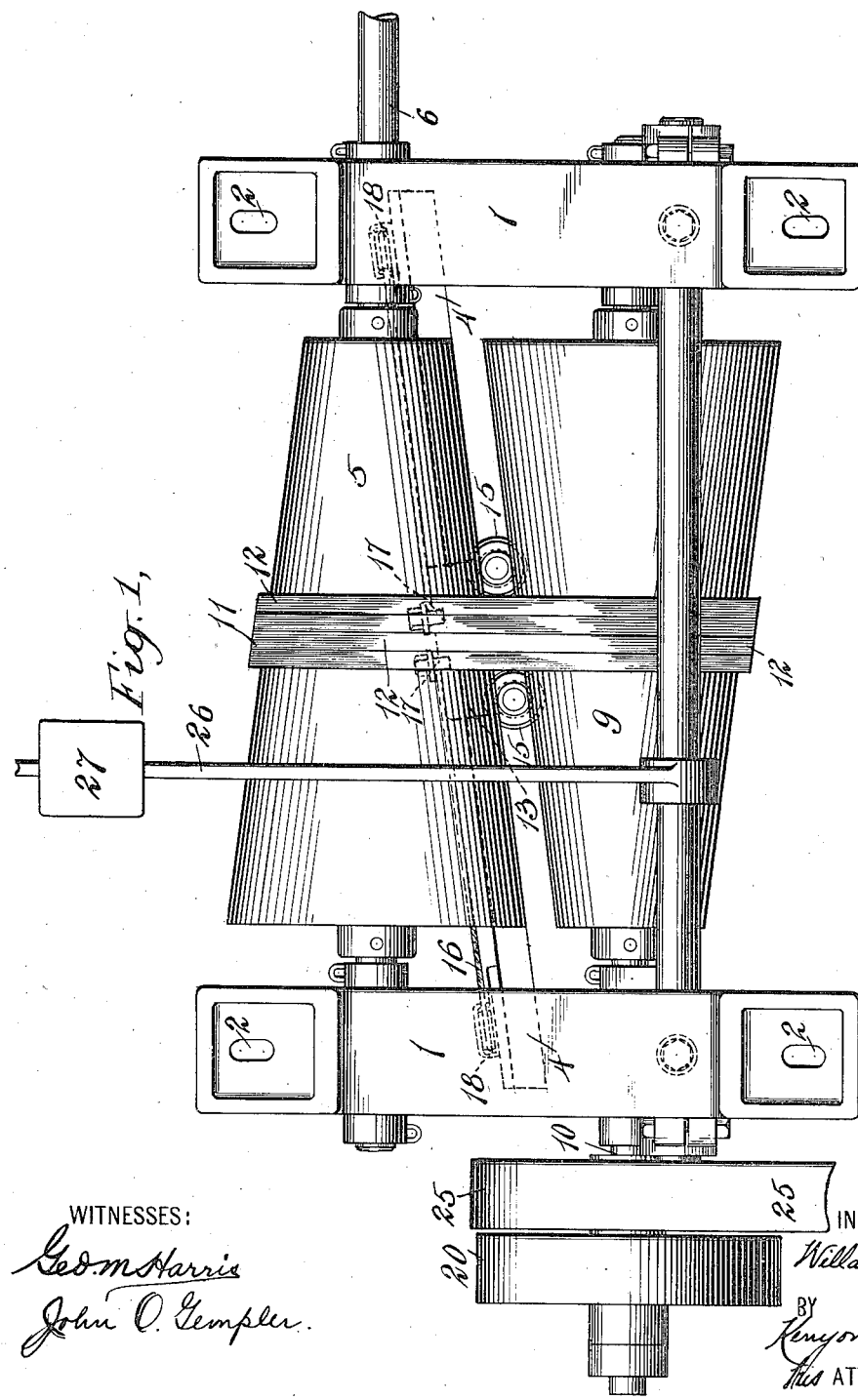
WITNESSES:
Geo. M. Harris
John O. Templer.
INVENTOR
Willard G. Bixby
BY
Kenyon & Kenyon
his ATTORNEYS.

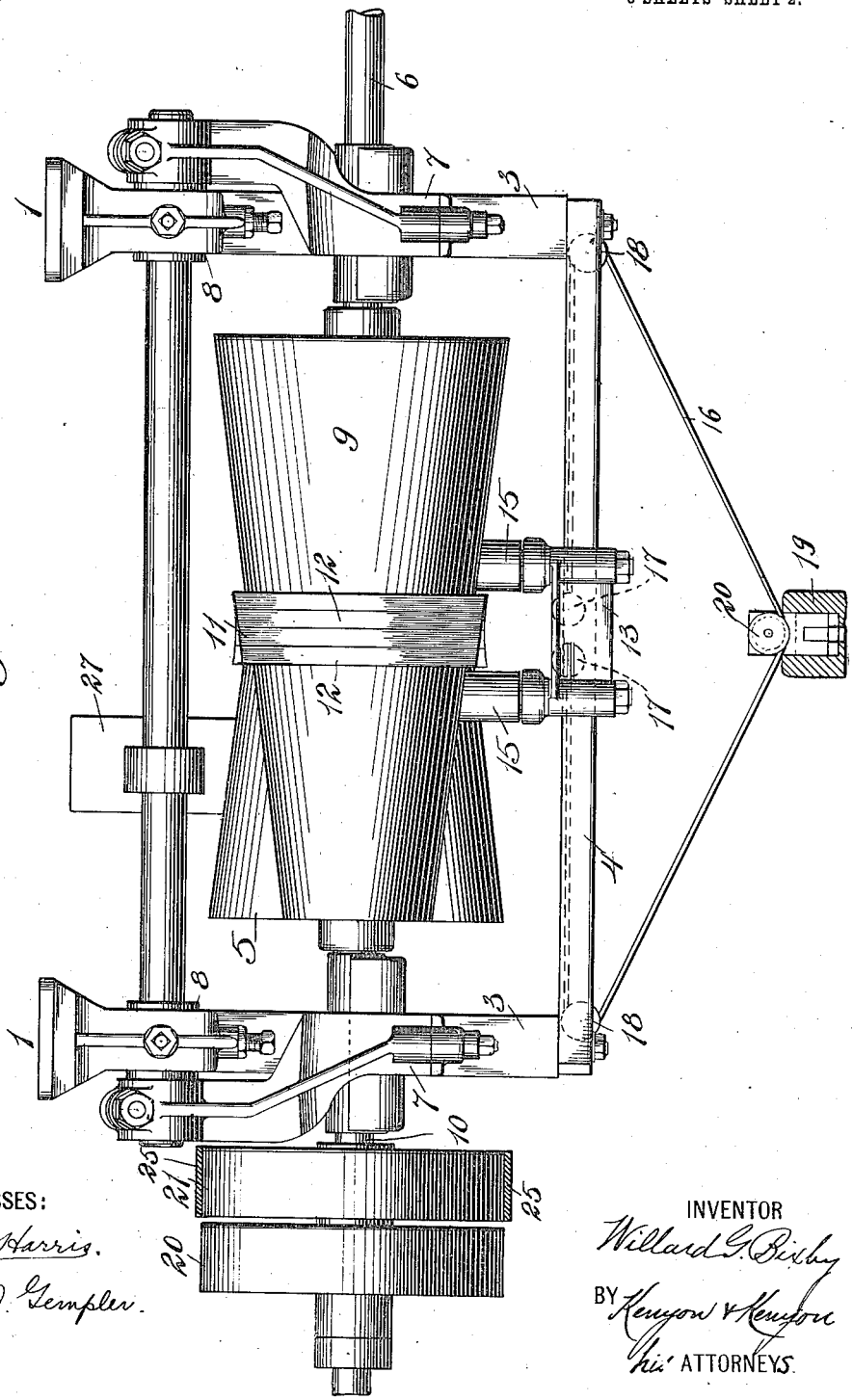
W. G. BIXBY.
VARIABLE SPEED MECHANISM.
APPLICATION FILED SEPT. 24, 1904.
1,063,410.
Patented June 3, 1913.
3 SHEETS—SHEET 2.

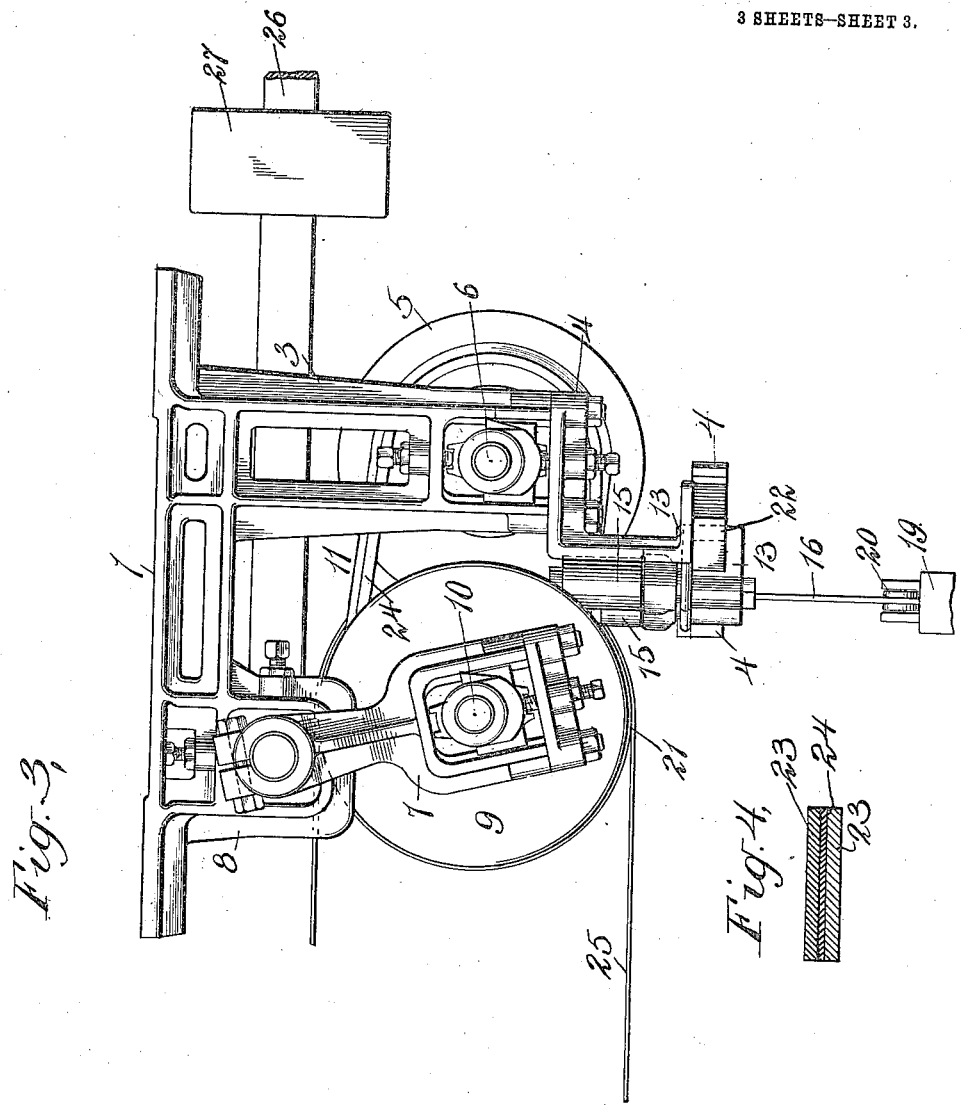

UNITED STATES PATENT OFFICE.

WILLARD G. BIXBY, OF NEW YORK, N. Y.

VARIABLE-SPEED MECHANISM.

1,063,410. Specification of Letters Patent. Patented June 3, 1913.

Application filed September 24, 1904. Serial No. 225,753.

*To all whom it may concern:*

Be it known that I, WILLARD G. BIXBY, a citizen of the United States, and a resident of the city, county, and State of New York, have invented certain new and useful Improvements in Variable-Speed Mechanisms, of which the following is a specification.

My invention relates to variable speed mechanism, and particularly to that class of said mechanism, in which the power is transmitted to a pulley.

In power transmitting mechanisms (whether constant or variable speed) in which the transmission of power from one pulley to another is effected solely by means of a belt surrounding both of said pulleys, the constant tendency of the belt is to stretch and thus become loose on the pulleys so as to prevent a satisfactory transmission of power from one pulley to the other. The irregularities of the ordinary belt itself also tend to make it loose on the pulleys. To overcome these difficulties, it has been the almost universal practice to place the pulleys at a considerable distance apart, so that the weight of the belt of a length sufficient to surround the pulleys in connection with its elasticity, would be sufficient to keep the belt taut on the pulley.

In variable speed power transmitting mechanisms in which cone pulleys are used with the means of transmission between said pulleys being only a belt surrounding said pulleys, there is a constant tendency for the belt to ride onto the part of the pulleys having the greatest diameter, and when the cones, are placed as is usually the case, with the large end of one pulley opposite the small end of the other pulley, the belt will tend to assume a position oblique to the pulleys. If the belt be allowed to assume such positions, it not only becomes so badly stretched as to not properly transmit power, but it stretches irregularly, so that it soon is in such a condition as to no longer transmit power at a variable speed. The tendency of the belt to ride to the part of the pulleys having the greatest diameter is also so strong that it will cause great wear on both the belt and the pulleys.

I have found from practical experience that the tendency for the belt to ride onto the part of cone pulleys having the greatest diameter, and therefore to impair the efficiency of the belt as a variable speed power transmitter, is decreased in proportion as the distance between the pulleys is lessened, and by decreasing said distance sufficiently, the tendency is eliminated. But, in addition, something is needed to overcome the tendency of the belt surrounding pulleys that are near together, from becoming slack upon the pulleys.

Several forms of apparatus have been employed for variable speed power transmission. The oldest and one that has been in use a great many years consists of two cone pulleys situated at a considerable distance apart surrounded by a belt. Two belt shifters or adjusters are used one near each pulley for the double purpose of properly adjusting the belt on said pulleys and preventing the belt from riding up to the portions of the pulleys having the largest diameter. This tendency of the belt to ride causes so great wear on the belt and shifters that this form is made only in small sizes. Another form of variable speed apparatus consists in two cone pulleys placed some distance apart and two additional belts for surrounding loosely said pulleys respectively, and interposed between said pulleys and the main or transmitting belt, and forming bearings for the same that will conform with the peripheries of the pulleys, so as to retain the main belt in its proper position. Another form of variable speed apparatus consists of two pairs of cone pulleys, those of each pair arranged to slide on the same shaft, with their small ends adjacent to each other, and of greatly increasing diameter from their small to their large ends. These two sets of pulleys are situated at some distance apart and a belt passes around the shafts of both sets and between the pulleys of both sets. Additional mechanism is employed to bring the pulleys of one set together and to separate those of the other set, so that one set of pulleys will wedge themselves under the opposite edges of the belt, while the pulleys of the other set will withdraw themselves from said edges. The pulleys engage only the edges of the belt, squeezing against it at its opposite edges. If there should be any slipping between the pulleys and the belt, as is likely to happen, there would be great friction and loss of power. All of the above described mechanisms require a large number of parts and take up considerable space. A variable speed apparatus has also been used in which two cone pulleys are situated near each other, and the power is transmitted from one to the other by means of an interposed belt, which loosely surrounds one pulley, the belt being squeezed between the pulleys. Although this construction has the advantage of simplicity and occupies a small space, the belt touches each pulley for a very small space only, and there is insufficient bearing surface between the belt and pulleys to transmit more than a small amount of power. The great pressure between the pulleys and belt to enable even slight power to be transmitted, causes great friction and consequent loss of power, and this construction is impracticable in cases where more than a slight amount of power is required to be transmitted.

My invention overcomes all the above difficulties, and provides a simple and inexpensive apparatus, of few parts, that can be readily repaired or renewed; that occupies very little space, and that will transmit any amount of power required.

The accompanying drawings illustrate one embodiment of my invention, in which—

Figure 1 is a plan view. Fig. 2 is a side elevation. Fig. 3 an end view, and Fig. 4 a cross section of a special form of transferring belt for surrounding the pulleys.

Similar characters represent like parts in all the figures.

1 is a supporting frame of the apparatus, provided with holes 2 at its four corners by which it may be suspended. The frame 1 is provided with two downwardly extending and substantially parallel portions 3, and a substantially horizontal portion 4 connecting the lower ends of the portions 3.

5 is a cone pulley, having its shaft 6 supported in journal bearings in the two portions 3 of the frame, and said shaft extends in substantially the same longitudinal direction as the portion 4 of the frame.

7—7 are two swinging hangers pivoted in journal bearings 8—8 of the frame 1, so that said hangers at their points of suspension will be substantially the same distance apart from the shaft of the pulley 5.

9 is a cone pulley having its shaft 10 journaled in the hangers 7—7, with the axis substantially parallel with that of the pulley 5, and with the small end of said pulley 9 adjacent to the large end of the pulley 5. 11 is a belt surrounding both of said pulleys 5 and 9, and of a length, when surrounding the pulleys and taut on the same to keep them with their centers at a distance from each other, about equal or less than the sum of their mean diameters. This belt is preferably divided longitudinally into a plurality of sections 12.

13 is a yoke having means for engaging with a longitudinal guideway 14 of the part 4 of the frame and adapted to slide thereon, the two arms or prongs of said yoke 13 extending upward between the pulleys 5 and 9 and spanning the belt 11. These arms or prongs are formed of two anti-friction rollers 15—15, journaled vertically upon the body of the yoke.

16 is a cord or other line having its two ends secured to the yoke 13 as at 17—17, and extending in opposite directions along part 4 and over the pulleys 18—18 on said part 4.

19 is a weight provided with a pulley 20 which is suspended by said pulley on the line 16 between the two pulleys 18—18. This weight 19 tends to keep the line 16 taut, and said line provides means for drawing the yoke 13 in either direction along the part 4 of the frame, and consequently drawing the belt 11 in the same direction, the weight 19 acting to retain said yoke and belt in their adjusted positions. In Fig. 3 the belt 11 is shown of a length short enough to draw the pulley 9 and its hangers 7—7 toward it and away from the position said pulley would naturally assume by gravity, so that the gravity of said hangers and pulley will cause the belt to remain taut upon both of the pulleys, and so that when one pulley is rotated the other will be rotated, and there will be no loss of power. Motion may be transmitted from either pulley to the other as desired, but I have shown loose and fast pulleys 20, 21 on the shaft 10 of the swinging pulley 9, for imparting motion to said pulley. The variable speed will then be transmitted from said pulley 9 through the belt 11 to the pulley 5, and through the shaft 6 of said pulley to any mechanism connected with said shaft.

It has been found by practical experience that the farther apart the centers of the cone pulleys are beyond a certain distance, the greater will be the tendency of the belt to ride to the larger end of the pulleys, and assume an oblique position on the same, and conversely the less the distance between the centers of the pulleys at this point, the less will be the tendency of said riding of the belt. When the pulleys almost touch each other, the tendency of the belt to ride onto the larger ends of the pulleys is practically *nil*, and said tendency to ride is almost unappreciable until the distance between the centers of the pulleys is greater than the sum of their mean diameters, or in other words the sum of the diameters of the pulleys taken half way between their ends. If the distance between the centers of the pulleys be substantially greater than the sum of their mean diameters, the belt will ride or climb toward the larger ends of the pulleys and assume an oblique position upon the same, so that the position of the belt on one pulley will not be opposite that on the other pulley, and the value of the apparatus as a variable speed transmitter will be materially impaired. The apparatus as shown in the drawing, shows the distance between the centers of the two pulleys 5 and 9 considerably less than the sum of their mean diameters, for by the use of said apparatus, as shown in the drawings and as above described, just as good results can be attained as if the pulleys were at a distance equal to the sum of their mean diameters; and as the least space an apparatus occupies in a factory, is always a very material object, it will be seen that the best results can be attained by my apparatus as shown and described.

The longitudinal guide for the yoke 13 is preferably parallel with the space between the two pulleys 5 and 9, (see Fig. 1), and the yoke 13 may be supported and adapted to slide upon the part 4 in any well known manner. In the drawings I have shown the lower part of the yoke 13 provided with a substantially square hole 22 (see dotted lines) with the part 4 passing through said hole and supporting the yoke, and said part 4 being a bar extending parallel with the space between the pulleys 5 and 9 (see Figs. 1 and 3), and forming the longitudinal guideway for said yoke.

The driving belt 25 on the pulleys 20 or 21 will be pulling in a direction opposite to that of belt 11, and will act positively to keep the belt 11 taut, even if the gravity of the pulley 9 and its hanger do not accomplish this purpose. An additional means for keeping the belt 11 taut on the pulleys 5 and 9, consists of a bar 26 secured to the journals of the pulley 9 and extending in the direction of the belt 11, and supporting a weight 27, which may be adjustable on said bar. This bar and weight act as a counter weight to constantly bear the pulley 9 in a direction away from the pulley 5, and consequently keep the belt 11 taut on said pulleys.

The transferring belt such as I prefer to use, and which gives most satisfactory results, is formed as above described of longitudinal sections and of leather. Very good results are attained, however, by a belt made from two or more layers alternately arranged of a yielding material 23, such as rubber and of non-distensible material, 24, such as canvas. The yielding quality of such a belt will permit it to accommodate itself to the difference in the diameters of the pulleys but prevent the belt from stretching.

By my invention, a variable speed apparatus is provided that is simple, one that can be manufactured at a small cost, and one which can readily be repaired and have its several parts renewed. My invention is also one that can transmit any amount of speed and power without any appreciable loss of the latter, and can thus give the very best results.

My invention in its broadest aspects, is not limited to the precise construction herein described and shown, as many changes in the same other than those suggested may be made without departing from the main principles of my invention, or sacrificing its chief advantages.

What I claim as new and desire to secure by Letters Patent is:

1. A variable speed apparatus comprising two cone pulleys having their axes substantially parallel, and one of said pulleys movably journaled so that it may be drawn toward or away from the other pulley, a belt surrounding and connecting said pulleys so that the distance between the centers of the pulleys is not greater than their mean diameters, another pulley on the movable journals, and a belt surrounding said pulley and constantly tending to draw the same away from the other pulley so as to keep taut the belt surrounding the two pulleys.

2. A variable speed apparatus comprising two cone pulleys having their axes substantially parallel, loosely suspended hangers in which one of said pulleys is journaled so that it may be drawn toward or away from the other pulley, and a belt surrounding said pulleys so that the distance between the centers of the pulleys is not greater than their diameters, and said belt holding the suspended pulley away from the position it would naturally assume by gravity, whereby the gravity of said pulley will tend to keep the belt taut.

3. A variable speed apparatus comprising two cone pulleys having their axes substantially parallel, loosely suspended hangers in which one of said pulleys is journaled so that it may be drawn toward or away from the other pulley, and a belt surrounding said pulleys so that the distance between the centers of the pulleys is not greater than their mean diameters, and said belt holding the suspended pulley away from the position it would naturally assume by gravity, and means for drawing said pulley toward said position.

In testimony whereof, I have signed my name to this specification, in the presence of two subscribing witnesses.

WILLARD G. BIXBY.

Witnesses:
PENNINGTON HALSTED,
GEO. M. HARRIS.